United States Patent

[11] 3,624,548

| [72] | Inventor | Thomas P. Sosnowski<br>Colts Neck, N.J. |
|---|---|---|
| [21] | Appl. No. | 814,617 |
| [22] | Filed | Apr. 9, 1969 |
| [45] | Patented | Nov. 30, 1971 |
| [73] | Assignee | Bell Telephone Laboratories, Incorporated<br>Murray Hill, Berkeley Heights, N.J. |

[54] DISCHARGE TUBE CONFIGURATION OF METAL-VAPOR ION LASER
5 Claims, 2 Drawing Figs.

| [52] | U.S. Cl. | 331/94.5 |
|---|---|---|
| [51] | Int. Cl. | H01s 3/22 |
| [50] | Field of Search | 331/94.5 |

[56] References Cited
UNITED STATES PATENTS

| 3,388,314 | 6/1968 | Gould | 331/94.5 X |
|---|---|---|---|
| 3,449,694 | 6/1969 | Bell | 331/94.5 |
| 3,464,025 | 8/1969 | Bell | 331/94.5 |
| 3,486,058 | 12/1969 | Hernquist | 331/94.5 |

OTHER REFERENCES
Vogel: Electronics, Jan. 4, 1963, pp. 102 & 104

Silfvast: App. Phys. Lett., Vol. 13, pp. 169– 171, Sept. 1, 1968
Silfvast et al.: App. Phys. Lett., vol. 8, pp. 318– 319 June 15, 1966
Silfvast et al.: App. Phys. Lett., vol. 11, pp. 97– 99, Aug. 1, 1967
Electronics, vol. 142, No. 16, Aug. 4, 1969, pp. 177– 179

*Primary Examiner*—Ronald L. Wibert
*Assistant Examiner*—Edward S. Bauer
*Attorneys*—R. J. Guenther and Arthur J. Torsiglieri ABSTRACT: A discharge tube configuration for a cadmium-ion laser is disclosed which prevents deposition of cadmium on the interior surfaces of the Brewster's-angle windows of the discharge tube. A split excitation arrangement is employed with a cathode in the center and an anode at either end; and the phenomenon of cataphoresis is used to advantage by disposing a pair of reservoirs of metallic cadmium nearer to respective ones of the anodes than to the cathode. The reservoirs have openings adjacent the discharge path, and are controlled in temperature independently of the discharge tube temperature. An appropriately uniform density of cadmium ions as a minority constituent in an auxiliary gas of helium is also achieved by this arrangement in cooperation with the cataphoresis.

INVENTOR
T. P. SOSNOWSKI
BY Wilford L. Wiesen
ATTORNEY

DISCHARGE TUBE CONFIGURATION OF METAL-VAPOR ION LASER

BACKGROUND OF THE INVENTION

This invention relates to metal vapor lasers in which an ion of the metal is a minority constituent in a more abundant auxiliary gas.

Certain metal vapor ion lasers have recently achieved surprising efficiencies and power outputs, even on a continuous-wave basis, in relatively simple direct-current discharge configurations. Some of the more promising ones employ a Penning-type reaction provided when the carrier gas is helium or neon, which may provide high-lying metastable energy levels which transfer energy to lower energy levels of the metal vapor ion. A free electron carries off the excess energy corresponding to the difference in energy between those levels. Such lasers are disclosed and claimed in the patent application of W. T. Silfvast, Ser. No. 759,922, filed Sept. 16, 1968, now abandoned in favor of the copending continuation-in-part application of W. T. Silfvast, Ser. No. 819,859, filed Apr. 28, 1969, both of which are assigned to the assignee hereof.

Also, in the cadmium-ion laser operating at 4416 A. units, excellent efficiency and power output are achieved in a mixture in which the auxiliary gas, helium, is predominant. This particular laser is very promising since it operates in the blue region of the visible structure and has discharge tube and output power characteristics very similar to that of the well-known helium-neon laser.

A serious drawback of metal vapor lasers and of the cadmium laser at 4416 A. units in particular, is that metal vapor is deposited on the interior surfaces of the Brewster's-angle windows as the tube operates. As a result, the laser output decreases and is eventually extinguished. The metal vapor deposits preferentially on the cool ends of the discharge tube. The central portion in the cadmium laser typically is heated to at least 300° C. by heating tapes or by the discharge itself to prevent condensation of the cadmium. To slow the cadmium deposit, the windows of the tube may be separately heated. Such arrangements are cumbersome and at least partly ineffective.

In addition, it has been necessary, as disclosed in the above-cited applications of W. T. Silfvast, to provide a large number of cadmium reservoirs at frequent intervals along the tube, in order to obtain a substantially uniform cadmium vapor pressure throughout the length of the tube.

SUMMARY OF THE INVENTION

I have discovered that the deposit of cadmium on the end windows of such a tube is a function of discharge tube configuration. Prior art configurations are severely limited in performance and usable lifetime by the phenomenon of cataphoresis, which will be explained in more detail hereinafter. I have also discovered that the disadvantages of cataphoresis may be eliminated and the phenomenon itself turned to advantage in improved configurations, which also solve the problem of maintaining a substantial uniform cadmium density throughout the length of the tube.

In particular, according to my invention, the discharge tube configuration includes a split excitation arrangement having a cathode near the center of the tube and an anode near either end, and a pair of metallic cadmium reservoirs nearer to respective ones of the anodes than to the cathode, so that propagation of positive cadmium ions toward the cathode, which is one aspect of cataphoresis, provides the substantially uniform cadmium density or vapor pressure throughout the discharge length of the tube.

The use of only a pair of reservoirs and the cataphoretic pumping effects make the use of relatively high currents feasible and quite desirable, with a consequent improvement in overall performance.

Because discharges of higher current may be used than in the prior art, external heating of the discharge tube between the reservoirs is not typically necessary, although the reservoirs themselves are temperature-controlled by external means, such as ovens.

One outstanding advantage of my invention is that lasers according to my invention can be built and operated as easily as the familiar helium-neon lasers and are superior thereto in that they provide greater gain and power output and, for many applications, operate in a more desirable region of the visible spectrum.

A further feature of my invention resides in its application to other metal vapor ion lasers of the type employing a minority constituent of the metal vapor in a more abundant auxiliary gas. In all such lasers the lifetimes or durations, of useful uninterrupted operation are greatly increased.

BRIEF DESCRIPTION OF THE DRAWING

Further features and advantages of my invention may be obtained from the following detailed description, taken together with the drawing, in which.

DESCRIPTION OF ILLUSTRATIVE EMBODIMENT

Figure 1:
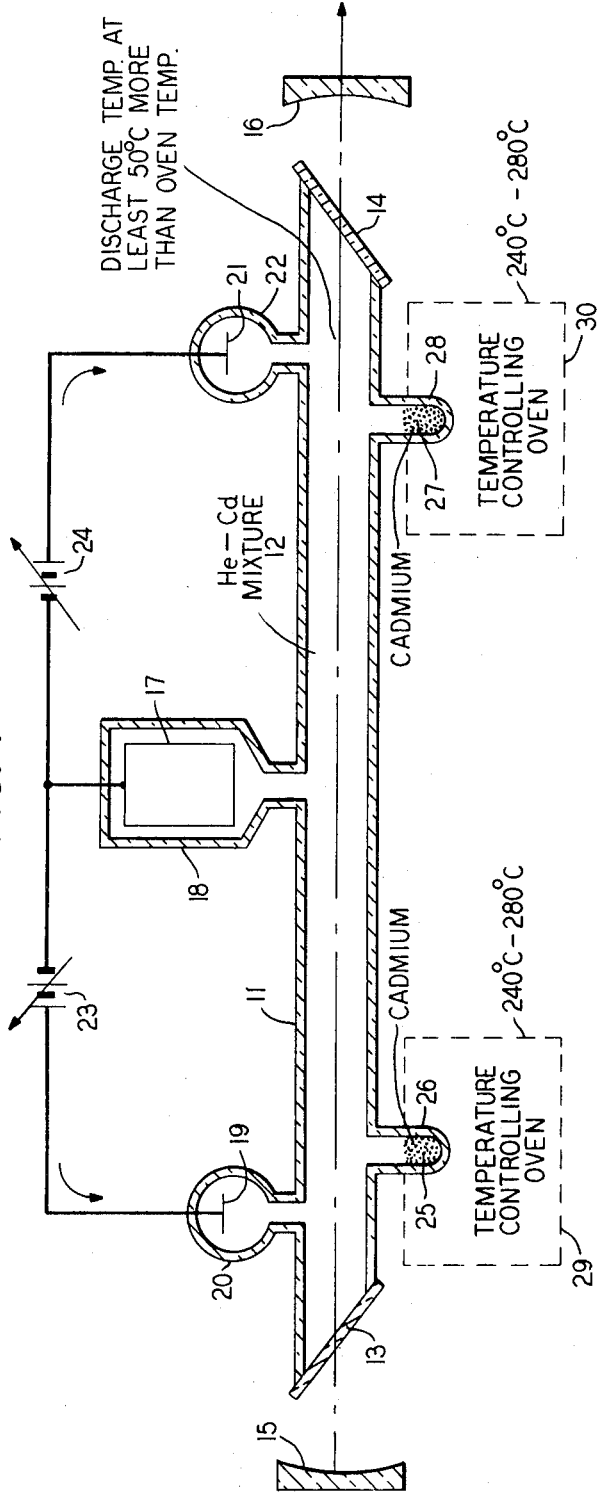
FIG. 1 is a partly pictorial and partly schematic illustration of one illustrative embodiment of my invention.

Before explaining the details of the discharge tube configuration of the embodiment of FIG. 1, one will find it helpful to consider the phenomenon of cataphoresis as it is known in the prior art, for example, in the article by M. J. Druyvesteyn in *Physica*, Vol. 2, page 255 Mar. 1935) or in the article by J. Freudenthal, *Journal of Applied Physics*, Vol. 38, page 4818 (Nov. 1967). While cataphoresis has heretofore been used for gas purification and is used in a contrary fashion in the present invention, it is known that the density distribution of the minority constituent in a gas mixture in a discharge is strongly affected by the discharge current. The distribution typically producible by diffusion is strongly upset. For example, in a discharge tube containing a noble gas, such a helium, and a metal vapor, the latter is selectably transported toward the cathode end of the tube. Usually the material which is moved toward the cathode has a lower ionization potential and a partial pressure which is small compared to the total partial pressure. The principal mechanism for the transport of the minority element is its ion current. This phenomenon, cataphoresis, is in contrast to what is observed in pure gas discharges. In the latter case, the ions and electrons exert a net momentum on the neutral gas atoms and cause a gas pressure increase at the anode. While equations have been developed to show the partial pressure distribution of the minority constituent in gas purification apparatuses, the prior art has emphasized application of cataphoresis to gas purification, except for some application in scientifically oriented spectroscopic studies of metal vapor in rare gas, direct-current discharges. For example, see Druyvesteyn, cited above, and R. H. Springer et al., *Journal of Applied Physics*, Vol. 39, page 3100 (June 1968).

In contrast, in the configuration of the embodiment of FIG. 1, the phenomenon of cataphoresis is employed to maintain a substantially uniform axial density distribution of cadmium in a small-bore tube containing helium and cadmium.

For a more complete understanding of the competing roles of cataphoresis and diffusion in this embodiment, the following definitions are helpful. The rapidity with which the laser ions will be transported by cataphoresis depends on the ion mobility. Mobility is a measure of the ions' capability of moving in an applied electric field gradient. The term mobility will not be used hereinafter; and the term cataphoresis will be used exclusively when referring to the effects of the discharge and the electric field.

In contrast, diffusion constant or diffusion length is a measure of the atoms' or ions' capability of moving in response to a density or pressure gradient of the atoms or ions. It is readily seen that diffusion will in all cases tend to carry some atoms or ions of the vaporizable solid, e.g., cadmium, toward the end windows. The illustrative embodiment counteracts this tendency.

It should be noted that gas partial pressure is proportional to the density times the absolute temperature. In comparing two gases in a mixture, partial pressure is typically used; for other considerations, density is frequently more pertinent and will be used where appropriate.

In the embodiment of FIG. 1, the 4-millimeter bore Pyrex discharge tube 11 contained a gas mixture 12 including predominantly helium and a small partial pressure fraction of cadmium vapor. The tube 11 has Brewster's-angle end windows 13 and 14 of high-quality quartz and is disposed in an optical resonator including the reflectors 15 and 16 which have multiple-layer dielectric coatings for maximum reflectance in the blue region of the spectrum. Reflector 16 is made partially transmissive to enable a portion of the coherent radiation to be extracted.

The split discharge configuration includes a cathode 17 disposed in a central side arm 18 of tube 11 and anodes 19 and 21 symmetrically disposed with respect to the end windows of the tube at an axial distance of about 8 centimeters therefrom in side arms 20 and 22. This axial distance is not critical and may vary widely. Direct-current voltage sources 23 and 24 are connected in appropriate polarity between cathode 17 and anodes 19 and 21 and are kept balanced although variable in magnitude. Essentially pure metallic cadmium, preferably of a single isotope $Cd^{114}$ or other suitable vaporizable solid for other embodiments, is placed in two separate bodies 25 and 27 within side arms or reservoirs 26 and 28, which are disposed along the tube at a selected distance from the axial positions of side arms 20 and 22. In particular, the reservoirs 26 and 28 are much nearer to the side arms 20 and 22, respectively, than to the side arm 18 in which cathode 17 is disposed. For example, they are about 2 centimeters of the axial positions of the anode side arms but illustratively about 5 centimeters or more from the axial position of the cathode side arm. While the dimensions of the reservoirs may vary widely, typical reservoirs were 3 centimeters long and 8 millimeters in diameter with an orifice or opening of 3 millimeters. The dimensions are only illustrative, but provide sufficient capacity for long tube life.

In general, for any metal vapor or other vapor of a solid, of which cadmium is just one example, the reservoirs are displaced axially from the anodes toward the cathode by a first distance, the supplied current having value producing cataphoresis sufficient in relationship to the first distance and the diffusion length of the vapor of the solid to keep substantially all of the vapor away from the windows. Although the first distance is about 2 centimeters in this embodiment, in each modified embodiment it may be increased or decreased somewhat by experiment. For laser ions of greater diffusion length, the first distance would be increased.

Separate temperature-controlling ovens 29 and 30 are provided for the reservoirs 26 and 28, respectively. At currents between 50 milliamperes and 100 milliamperes, adequate temperature of the gas between the reservoirs may be maintained by a separate oven (not shown) around the tube or by an insulating jacket or heat-reflective foil (aluminum foil) jacket around the tube. Nevertheless, such temperature control is primarily useful only for scientific investigations, since in the configuration of FIG. 1 adequate temperature can be maintained by the discharge itself at currents above 100 milliamperes. A presently preferred discharge tube temperature is at least 50° C. hotter than the reservoir temperatures; and a presently preferred reservoir temperature is 260° C. which corresponds to about $1 \times 10^{14}$ cadmium-ions per cubic centimeter or a partial pressure of $5 \times 10^{-3}$ Torr. The reservoir temperature may range from 240° C. to 280° C.

In operation, discharge currents between anodes 19 and 21, respectively, and the cathode 17 are illustratively greater than 50 milliamperes, preferably greater than 100 milliamperes, and may range up to about 200 milliamperes or more, in each tube half, depending on the refractory properties of the tube.

In the illustrative embodiment, helium pressures between 1.5 Torr and 12 Torr are used; and the single cadmium isotope $Cd^{114}$ is used. Preferably, the helium pressure is between 2 and 4 Torr. Nevertheless, other helium pressures outside of the first-mentioned range and other cadmium isotopes, including natural cadmium, may be used. Power outputs in excess of 100 milliwatts have been achieved with a 1-kilowatt total input power in a tube 1½ meters long with 2.9 Torr total pressure and 150 milliamperes in each tube half.

Figure 2:
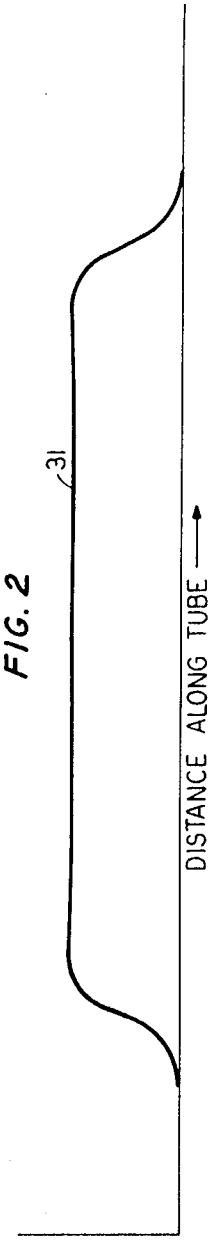
FIG. 2 shows a curve representing the distribution of cadmium density along the axis of the discharge tube in the presence of the discharge.

It has been found that substantially uniform density distribution of cadmium extending along the discharge length of the tube 11 between the side arms 20 and 22 is obtained with the reservoirs 26 and 27 near the respective anodes and with discharge currents greater than 50 milliamperes in each half of the split excitation arrangement. The 50 milliamperes is the threshold level for uniform cadmium distribution in the presence of the discharge, in the illustrative embodiment. In fact, the cadmium density distribution appears to be substantially as shown by curve 31 of FIG. 2. It will be noted that the density reaches two respective maxima at axial points along the tube at about the axial positions of reservoirs 26 and 28; and droops only very slightly toward the center of the tube near cathode 17.

While the continual propagation of cadmium toward the cathode 17 by the phenomenon of cataphoresis will result in a very slow loss of cadmium near or at the cathode, this effect has not proved to be substantially deleterious to the operation of the tube. Operating lifetimes of up to 500 hours have already been attained with reasonable size reservoirs 26 and 27 (such as specified above) of cadmium metal. Beyond the reservoirs 26 and 27 toward the end windows 13 and 14, regions which are little affected by the discharge, the cadmium density drops off at an exponential rate to a vanishingly small density at an axial position short of the end windows 13 and 14. It should be noted that substantially all of this decrease in density is, and should be, achieved between the reservoirs and the anodes.

It should readily be appreciated that for different pressures of the auxiliary gas, or for different tube bores, tube lengths, or different metal vapors the current threshold for substantially uniform metal vapor distribution will vary substantially. Nevertheless, my analysis has shown that there will be a current threshold in each case for achieving the advantage of this aspect of my invention. The appropriate relationships of parameters are best determined for a particular case by experiment in accordance with the foregoing principles of my invention. Thus, a split, direct-current excitation arrangement with anodes near either end should be employed and a pair of reservoirs of the pure metal to be vaporized should be disposed axially much nearer to the anodes than to the cathode, with the reservoirs opening toward the discharge path.

Moreover, in reference to the other aspect of my invention, it should be clear that it is possible to prevent deposition of any metal vapor upon the end windows of the discharge tube by employing the split excitation arrangement with the anodes displaced from the end windows and a cathode between the anodes, the reservoirs being displaced sufficiently for the anodes. Cataphoresis will then overcome diffusion effects and move the metal vapor ions predominantly toward the cathode and will prevent any significant amount of the metal vapor from reaching and depositing on the end windows. This result can be achieved whether or not end windows are heated by separate temperature-controlling means.

In employing the invention with other metal vapors or other solid vapors, it is important to note that the optimum discharge temperatures and corresponding metal vapor densities vary radically for different metals. The optimum discharge temperatures and the reservoir temperatures are best determined by experiment for each metal employed, In every case, the reservoir temperature exceeds the vaporization temperature of the metal or other solid; and the discharge temperature exceeds the reservoir temperature by a substantial amount, e.g., 50° C. In addition, the optimum helium pressure, or other auxiliary gas pressure, may be determined experimentally.

In addition to the phenomenon of cataphoresis, there are other pertinent phenomena which have been observed to occur in configurations like that of FIG. 1. For example, clusters of negatively charged particles, presumably occurring from cathode sputtering, have been observed in regions of the tube which are just out of the glow region of the discharge. These particles are typically in stable equilibrium just out of the discharge; but if the cathode were near to either Brewster's-angle window, these particles would nonetheless lose their charge eventually and then migrate to the adjacent tube wall and window. These particles have been observed in other configurations at both ends of AC discharges employing hollow cathodes but only at the cathode end of hot cathode discharges. Negative ions of cadmium may also be formed and would behave similarly. It is an advantage of my invention that the split excitation arrangement and the preferred disposition of a pair of reservoirs prevent these negatively charged particles, including negative ion clusters, form contributing to the deterioration of window transmission.

From the foregoing it should be clear that my invention is not necessarily limited to cadmium vapor lasers, nor is it necessarily limited to metal vapor lasers employing Penning-type reactions. The auxiliary gas may be a gas other than helium. In all cases of modification of the gas mixture, the appropriate range of parameters satisfying the principles of my invention are best determined by experiment by varying one parameter, such as tube bore, tube length, the discharge current, or the exact relative positioning of the pair of reservoirs, one at a time.

I claim:

1. Apparatus for producing stimulated emission of radiation, comprising means forming an interaction region in which the stimulated emission of radiation can occur and having windows through which a portion of the radiation can be extracted for utilization, means for exciting said laser-comprising anodes displaced axially from respective ones of said windows, a cathode disposed farther from the windows than the respective anodes, means for supplying an active medium in said region, comprising an auxiliary gas contained by the interaction region forming means and a single pair of reservoirs adjoining said forming means between said anodes and said cathode and containing a vaporizable ionizable solid, said reservoirs being disposed closer to respective ones of said anodes than to said cathode and having openings into said interaction region, means for supplying a direct-current electrical discharge between said anodes and said cathode sufficient to produce cataphoresis predominant over diffusion of said vaporizable solid, said anodes, reservoirs and cathode being axially spaced from each other to achieve, in cooperation with said discharge-supplying means, a substantially uniform density distribution of said vaporizable ionizable solid between said reservoirs, said windows being axially spaced from said anodes and reservoirs to provide a vanishingly small density of said vaporizable ionizable solid in the vicinity of said windows.

2. Apparatus according to claim 1 in which the auxiliary gas has a first partial pressure, the vapor of said solid having a second partial pressure substantially less than said first partial pressure, said discharge-supplying means being characterized by a supplied current greater than a threshold level making said second partial pressure substantially uniform between said pair of reservoirs.

3. Apparatus according to claim 2 in which said reservoirs are displaced axially from the anodes toward the cathode by a first distance, the supplied current having a value producing cataphoresis sufficient in relationship to said first distance and the diffusion length of the vapor of said solid to keep substantially all of said vapor away from the windows.

4. Apparatus for producing stimulated emission of radiation, comprising means forming an interaction region in which the stimulated emission of radiation can occur and having windows through which a portion of the radiation can be extracted for utilization, means for exciting said laser comprising an anode disposed relatively near to one of said windows, a cathode disposed farther from both of said windows than said anode is from said one window, means for supplying an active medium in said region, comprising an auxiliary gas contained by the interaction region forming means and a single reservoir adjoining said forming means between said anode and said cathode and containing a vaporizable ionizable solid, said single reservoir being disposed closer to said anode than to said cathode and having an opening into said interaction region, means for supplying a direct-current electrical discharge between said anode and said cathode sufficient to produce cataphoresis predominant over diffusion of said vaporizable solid, said anode, reservoir and cathode being axially spaced from each other to achieve, in cooperation with said discharge-supplying means, a substantially uniform density distribution of said vaporizable ionizable solid throughout the major portion of the distance between said anode and said cathode, said windows being axially spaced from said anode and said cathode to provide a vanishingly small density of said vaporizable ionizable solid in the vicinity of said windows.

5. Apparatus according to claim 4 in which the auxiliary gas has a first partial pressure, the vapor of said solid having a second partial pressure substantially less than said first partial pressure, said discharge-supplying means being characterized by a supplied current greater than a threshold level making said second partial pressure substantially uniform throughout the major portion of the distance between said anode and said cathode.

* * * * *